(12) United States Patent
Suzuki

(10) Patent No.: US 10,142,433 B2
(45) Date of Patent: Nov. 27, 2018

(54) CLIENT DEVICE, DATA COMMUNICATION SYSTEM, DATA COMMUNICATION METHOD, AND PROGRAM

(71) Applicant: Mitsubishi Electric Corporation, Tokyo (JP)

(72) Inventor: Shigeki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 15/125,665

(22) PCT Filed: Mar. 31, 2014

(86) PCT No.: PCT/JP2014/059517
§ 371 (c)(1),
(2) Date: Sep. 13, 2016

(87) PCT Pub. No.: WO2015/151186
PCT Pub. Date: Oct. 8, 2015

(65) Prior Publication Data
US 2017/0013079 A1    Jan. 12, 2017

(51) Int. Cl.
*G06F 15/16*       (2006.01)
*H04L 29/08*       (2006.01)
(Continued)

(52) U.S. Cl.
CPC .......... *H04L 67/2828* (2013.01); *H04L 67/04* (2013.01); *H04L 67/06* (2013.01);
(Continued)

(58) Field of Classification Search
CPC ......... H04L 67/02; H04L 67/04; H04L 67/06; H04L 67/2804; H04L 67/2828;
(Continued)

(56) References Cited

U.S. PATENT DOCUMENTS 6,073,075 A * 6/2000 Kondou ................ G01S 5/0027
340/988
6,253,246 B1 * 6/2001 Nakatsuyama .... H04N 7/17318
348/E7.071
(Continued)

FOREIGN PATENT DOCUMENTS

JP    2000-285060 A    10/2000
JP    2001-053619 A    2/2001
(Continued)

OTHER PUBLICATIONS

Extended EP Search Report dated Oct. 25, 2017 corresponding to EP patent application No. 14888392.9.
(Continued)

*Primary Examiner* — Ruolei Zong
(74) *Attorney, Agent, or Firm* — Posz Law Group, PLC

(57) ABSTRACT

A compression necessity determiner is configured to determine a necessity of compression of to-be-uploaded data to a server. A data compressor is configured to compress, when the compression necessity determiner determines that the compression of the to-be-uploaded data is necessary, the to-be-uploaded data in a predetermined scheme. When the compression necessity determiner determines that the compression of the to-be-uploaded data is unnecessary, a data sender sends data, in which a header is added to the to-be-uploaded data to the communication interface, and when the compression necessity determiner determines that the compression of the to-be-uploaded data is necessary, the data sender sends to the communication interface data in which a header, containing information indicating that the to-be-uploaded data is compressed data, is added to the to-be-uploaded data compressed by the data compressor.

9 Claims, 15 Drawing Sheets

(51) Int. Cl.
*H04N 21/436* (2011.01)
*H04N 21/4363* (2011.01)
*H04N 21/44* (2011.01)
*H04N 21/442* (2011.01)
*H04L 29/06* (2006.01)

(52) U.S. Cl.
CPC .......... *H04L 67/2804* (2013.01); *H04L 67/42* (2013.01); *H04L 69/04* (2013.01); *H04L 69/22* (2013.01); *H04N 21/4363* (2013.01); *H04N 21/43615* (2013.01); *H04N 21/44* (2013.01); *H04N 21/44227* (2013.01)

(58) Field of Classification Search
CPC ......... H04L 67/42; H04L 69/04; H04L 69/22; H04N 21/43615; H04N 21/4363; H04N 21/44; H04N 21/44227
USPC ........................................................ 709/203
See application file for complete search history.

(56) References Cited

U.S. PATENT DOCUMENTS

| | | | | |
|---|---|---|---|---|
| 6,842,768 | B1* | 1/2005 | Shaffer | H03M 7/30 709/203 |
| 7,117,252 | B1 | 10/2006 | Kumakura | |
| 2002/0029228 | A1* | 3/2002 | Rodriguez | G06F 17/30076 |
| 2003/0105852 | A1* | 6/2003 | Das | G06F 11/1482 709/223 |
| 2006/0010003 | A1* | 1/2006 | Kruse | G06Q 30/02 709/230 |
| 2011/0238859 | A1* | 9/2011 | Kitagata | G06Q 10/10 709/232 |
| 2013/0054837 | A1 | 2/2013 | Von Elgg et al. | |
| 2013/0103782 | A1 | 4/2013 | Afergan et al. | |
| 2013/0117298 | A1* | 5/2013 | Ray | G06F 17/30091 707/769 |
| 2014/0181969 | A1* | 6/2014 | Mousty | H04L 63/1408 726/23 |

FOREIGN PATENT DOCUMENTS

| | | |
|---|---|---|
| JP | 2003-196183 A | 7/2003 |
| JP | 2003-244698 A | 8/2003 |
| JP | 2005-204138 A | 7/2005 |
| JP | 2006-108995 A | 4/2006 |
| JP | 2010-224996 A | 10/2010 |

OTHER PUBLICATIONS

International Search Report of the International Searching Authority dated Jul. 1, 2014 for the corresponding International application No. PCT/JP2014/059517 (and English translation).

* cited by examiner

| DATA SIZE [KB] | PROCESSING TIME WHEN DATA IS COMPRESSED [ms] | PROCESSING TIME WHEN DATA IS UNCOMPRESSED [ms] |
|---|---|---|
| 100 | A1 | B1 |
| 200 | A2 | B2 |
| 300 | A3 | B3 |
| 500 | A4 | B4 |
| 1000 | A5 | B5 |

CONTROLLER 13
- APPLICATION PROCESSOR 130
- COMPRESSION NECESSITY DETERMINER 131
- DATA COMPRESSOR 132
- DATA SENDER 133
- DATA ACQUIRER 134

| DATA SIZE [KB] | PROCESSING TIME WHEN DATA IS DECOMPRESSED [ms] | PROCESSING TIME WHEN DATA IS NOT DECOMPRESSED [ms] |
|---|---|---|
| 100 | C1 | D1 |
| 200 | C2 | D2 |
| 300 | C3 | D3 |
| 500 | C4 | D4 |
| 1000 | C5 | D5 |

CLIENT DEVICE, DATA COMMUNICATION SYSTEM, DATA COMMUNICATION METHOD, AND PROGRAM

CROSS REFERENCE TO RELATED APPLICATION

This application is a U.S. national stage application of International Patent Application No. PCT/JP2014/059517 filed on Mar. 31, 2014, the disclosure of which is incorporated herein by reference.

TECHNICAL FIELD

The present disclosure relates to a client device, a data communication system, a data communication method, and a program.

BACKGROUND ART

Providing services in the configuration of a referred to as cloud is becoming popular. For example, a service configuration in which a client device that manages a power usage status, and the like, in a general household is communicably connected to a server of a service provider via the Internet, and an exchange of a large amount of data as needed is enabled is well known.

According to such a client device, in view of cost reduction, a Central Processing Unit (CPU) with not so high performance is equipped in many cases. In this case, when a large amount of data is exchanged with the server, the processing load on the CPU increases, possibly causing the client device to have a delay in main processing that should be executed. In order to solve this technical problem, conventionally, a scheme of exchanging compressed data between the client device and the server is typically adopted.

As for the compressed data communication, for example, Patent Literature 1 discloses a compressed image data transmitting device that determines the compression ratio of image data to be transmitted on the basis of the line speed of the communication line and the compression processing speed (computing power).

CITATION LIST

Patent Literature

Patent Literature 1: Unexamined Japanese Patent Application Kokai Publication No. 2003-244698

SUMMARY OF INVENTION

Technical Problem

Meanwhile, when communication with compressed data is performed as described above, and when, for example, the CPU of the client device does not have a high performance, depending on the size of data to be uploaded and the like, the processing load on the CPU increases more than that of a transmission with uncompressed data, possibly causing a delay in the main processing.

The present disclosure has been made to solve the above technical problems, and an objective of the present disclosure is to provide a client device, and the like, which is capable of suppressing a delay in main processing at the time of data communication.

Solution to Problem

In order to accomplish the above objective, a client device according to the present disclosure includes:
 a communication interface configured to communicate with a server;
 a compression necessity determiner configured to determine a necessity of compression of to-be-uploaded data to be uploaded to the server;
 a data compressor configured to compress the to-be-uploaded data in a predetermined scheme when the compression necessity determiner determines that the compression of the to-be-uploaded data is necessary; and
 a data sender configured
  to send, when the compression necessity determiner determines that the compression of the to-be-uploaded data is unnecessary, to the communication interface data in which a header is added to the to-be-uploaded data, and
  to send, when the compression necessity determiner determines that the compression of the to-be-uploaded data is necessary, to the communication interface data in which a header is added to the to-be-uploaded data compressed by the data compressor, the header containing information indicating that the to-be-uploaded data is compressed data.

Advantageous Effects of Invention

According to the present disclosure, a determination on the necessity of compression of the to-be-uploaded data is made, and when determination that the compression is necessary is made, the to-be-uploaded data is compressed and transmitted to the server. Thus, a delay in main processing is preventable at the time of data communication.

DESCRIPTION OF EMBODIMENTS

Embodiments of the present disclosure are described below in detail in reference to figures.

Embodiment 1

Figure 1:
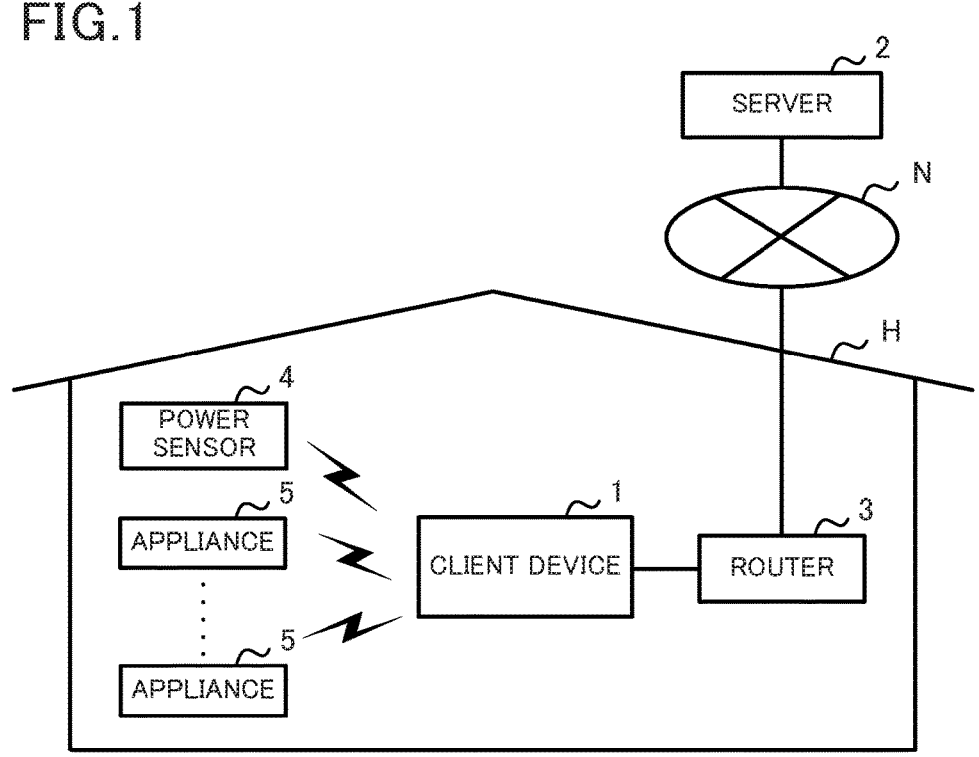
FIG. 1 is a diagram illustrating an overall configuration of a data communication system according to Embodiment 1 of the present disclosure.

FIG. 1 is a diagram illustrating an overall configuration of a data communication system according to Embodiment 1 of the present disclosure. This data communication system includes a client device 1 placed in a house H, and a server 2 connected to a wide area network N like the Internet.

The client device 1 is an energy management controller included in a system referred to as a Home Energy Management System (HEMS) that manages power utilized in a general household. The client device 1 is communicably connected to a power sensor 4 that measures the amount of power consumed in the household (consumer's site), and a plurality of appliances 5 via a wireless network (unillustrated) constructed in the house H. The respective appliances 5 are electric equipment installed in the house H, such as a lighting apparatus, an air conditioner, a refrigerator, an induction heating cooker, a rice cooker, a microwave oven, and a floor heating system.

The client device 1 is connected to the wide area network N via a router 3 adaptable to broadband, and exchanges data with the server 2 as needed. In this embodiment, a Transmission Control Protocol/Internet Protocol (TCP/IP) is applied as the communication protocol between the client device 1 and the server 2, and a HyperText Transfer Protocol (HTTP) is applied as a data communication protocol. Thereby, the client device 1 has an HTTP client function, while the server 2 has an HTTP server function.

Figure 2:
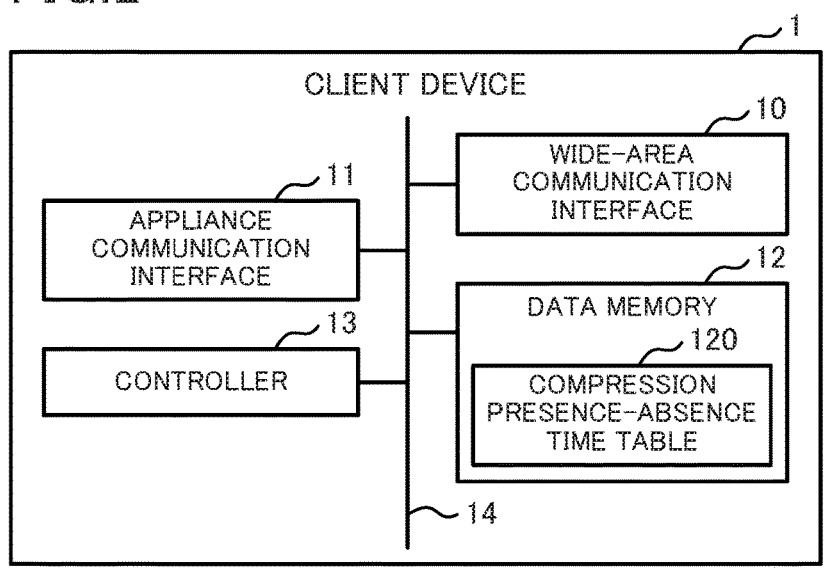
FIG. 2 is a block diagram illustrating a configuration of a client device according to Embodiment 1.

As illustrated in FIG. 2, the client device 1 includes a wide-area communication interface 10 for a communication with the server 2, an appliance communication interface 11 for a communication with the power sensor 4 and each appliance 5, a data memory 12 for storing programs and data, and a controller 13 that controls those components. The respective components are connected to one another via a bus 14.

The wide-area communication interface 10 is connected to the router 3, and is communicated and connected with the server 2 via the wide area network N. The wide-area communication interface 10 transmits, to the server 2, data supplied from the controller 13. In addition, the wide-area communication interface 10 supplies, to the controller 13, data received from the server 2.

The appliance communication interface 11 is connected to the above wireless network constructed in the house H, and performs wireless data communication with the power sensor 4 and each appliance 5 under the control of the controller 13.

The data memory 12 is, for example, a readable and writable non-volatile semiconductor memory like a flash memory. The data memory 12 stores a compression presence-absence time table 120. Although not illustrated, the data memory 12 stores a program for a data communication with the server 2, and data to be utilized when this program is executed. In addition, the data memory 12 stores a program for monitoring the amount of consumed power in the household, a program for controlling the operation of each appliance 5, and data to be utilized when those programs are executed.

Figures 3, 4:
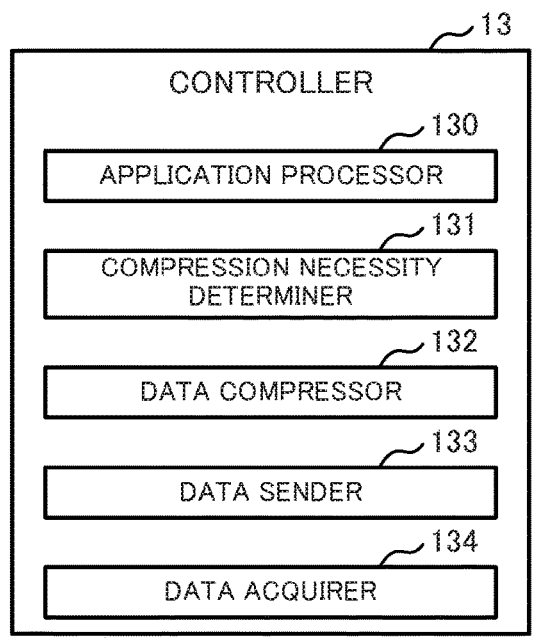
FIG. 3 is a diagram illustrating an example compression presence-absence time table according to Embodiment 1.
FIG. 4 is a diagram illustrating a functional configuration of a controller included in the client device according to Embodiment 1.

The compression presence-absence time table 120 (first time table) is a data table that stores, for each data size predetermined step by step, the necessary times for transmission processing by the controller 13 when data is compressed and is uncompressed. FIG. 3 illustrates an example compression presence-absence time table 120 according to this embodiment. The example illustrated in FIG. 3 shows that the necessary time for transmitting data with a data size of 100 [KB] by the controller 13 is A1 [ms] when the data is compressed and B1 [ms] when the data is uncompressed. Note that according to this embodiment, data to be uploaded to the server 2 (to-be-uploaded data) is text data, and GNU ZIP (gzip) is applied as a data compression scheme.

The controller 13 includes a Central Processing Unit (CPU), a Read Only Memory (ROM), a Random Access Memory (RAM), and the like (all unillustrated), and comprehensively controls the client device 1. As illustrated in FIG. 4, the controller 13 includes, as unique functions of the present disclosure, an application processor 130, a compression necessity determiner 131, a data compressor 132, a data sender 133, and a data acquirer 134.

The application processor 130 generates data (to-be-uploaded data) to be uploaded to the server 2. For example, the application processor 130 accumulates data history records relating to the transition of the amount of consumed power per day in the household by a predetermined time period (for example, a week), and generates the to-be-uploaded data. In addition, the application processor 130 executes a process in accordance with data (downloading data) downloaded from the server 2. For example, the application processor 130 displays information on the basis of the downloading data on an unillustrated terminal device (for example, a tablet type personal computer).

The compression necessity determiner 131 determines the necessity of compression of the to-be-uploaded data generated by the application processor 130. The compression necessity determiner 131 determines the necessity of compression of the to-be-uploaded data on the basis of the size of the generated to-be-uploaded data and the compression presence-absence time table 120. When, for example, the size of this to-be-uploaded data is 100 [KB], and when A1 is smaller than B1 is satisfied, the compression necessity determiner 131 determines that the compression is necessary, and when A1 is greater than or equal to B1 is satisfied, the compression necessity determiner 131 determines that the compression is unnecessary.

When the compression necessity determiner 131 determines that the compression is necessary, the data compressor 132 compresses the to-be-uploaded data generated by the application processor 130 in a predetermined scheme (in this embodiment, gzip).

The data sender 133 executes processing of generating data (transmission data) that is uncompressed or compressed to-be-uploaded data to which a header is added, and sending out the generated transmission data to the wide-area communication interface 10. More specifically, the data sender 133 executes processing of writing data having a predetermined size in a transmission buffer of the wide-area communication interface 10 in sequence from the head of the transmission data. The data sender 133 stores, in the header added to the compressed to-be-uploaded data information indicating that the data is compressed data (the detail is described later).

Figure 5:
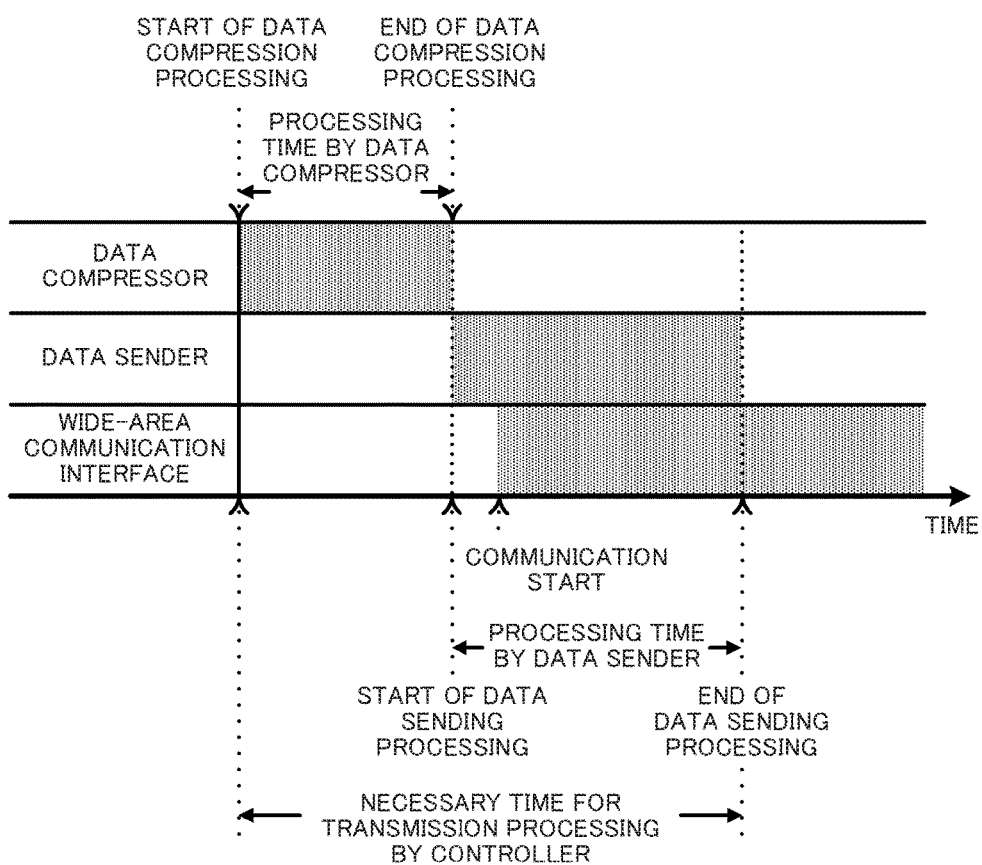
FIG. 5 is a diagram for describing a necessary time for transmission processing by the controller when data is compressed.

Here, a description is given of the necessary time for the transmission processing by the controller 13 when the to-be-uploaded data is compressed. In this case, as illustrated in FIG. 5, first, the data compressor 132 executes data compression processing, and after the completion of this data compression processing, the data sender 133 starts data sending processing. In the data sending processing, the transmission data that is compressed to-be-uploaded data to which the header is added is generated. The header to be added in this processing contains information indicating that the data is compressed data as described above.

Next, the transmission data is read from the head of the generated transmission data for every certain number of bytes, and is written in the transmission buffer of the wide-area communication interface 10. Next, when the last data is read from the transmission data, and is written in the transmission buffer of the wide-area communication interface 10, the data sending processing by the data sender 133 is completed.

According to this embodiment, the necessary time for the transmission processing by the controller 13 when the to-be-uploaded data is compressed as described above is a time obtained by adding the necessary time for the data compression processing by the data compressor 132 to the necessary time for the data sending processing by the data sender 133.

Figure 6:
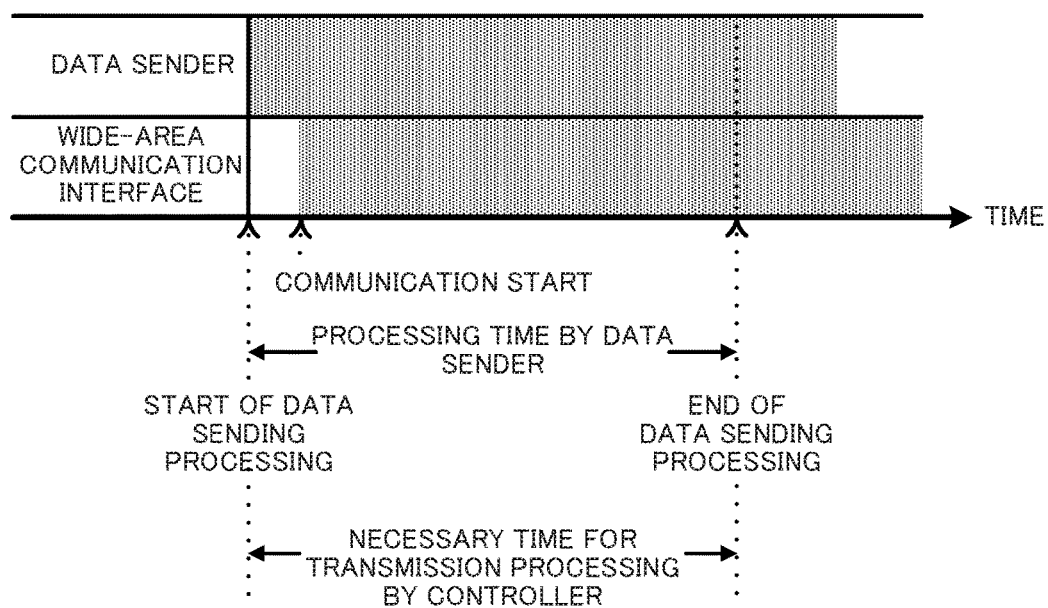
FIG. 6 is a diagram for describing a necessary time for the transmission processing by the controller when data is uncompressed.

Next, a description is given of a necessary time for the transmission processing by the controller 13 when the to-be-uploaded data is uncompressed. In this case, as illustrated in FIG. 6, the data sender 133 immediately starts the data sending processing. Transmission data that is uncompressed to-be-uploaded data to which a header is added is generated in the data sending processing. Needless to say, the added header in this case contains no information indicating that the data is compressed data.

Next, as described above, the transmission data is read from the head of the generated transmission data for every certain number of bytes in sequence, and is written in the transmission buffer of the wide-area communication interface 10. Next, when the last data is read from the transmission data, and is written in the transmission buffer of the wide-area communication interface 10, the data sending processing by the data sender 133 is completed.

According to this embodiment, the necessary time for the transmission processing by the controller 13 when the to-be-uploaded data is uncompressed as described above is equal to the necessary time for the data sending processing by the data sender 133.

Returning to FIG. 4, the data acquirer 134 executes processing of acquiring data (reception data) from the wide-area communication interface 10, the reception data having been transmitted from the server 2 and received by the wide-area communication interface 10. More specifically, the reception data is acquired from a reception buffer of the wide-area communication interface 10 for every certain number of bytes in sequence. The data acquirer 134 supplies the acquired reception data to the application controller 130.

Figure 7:
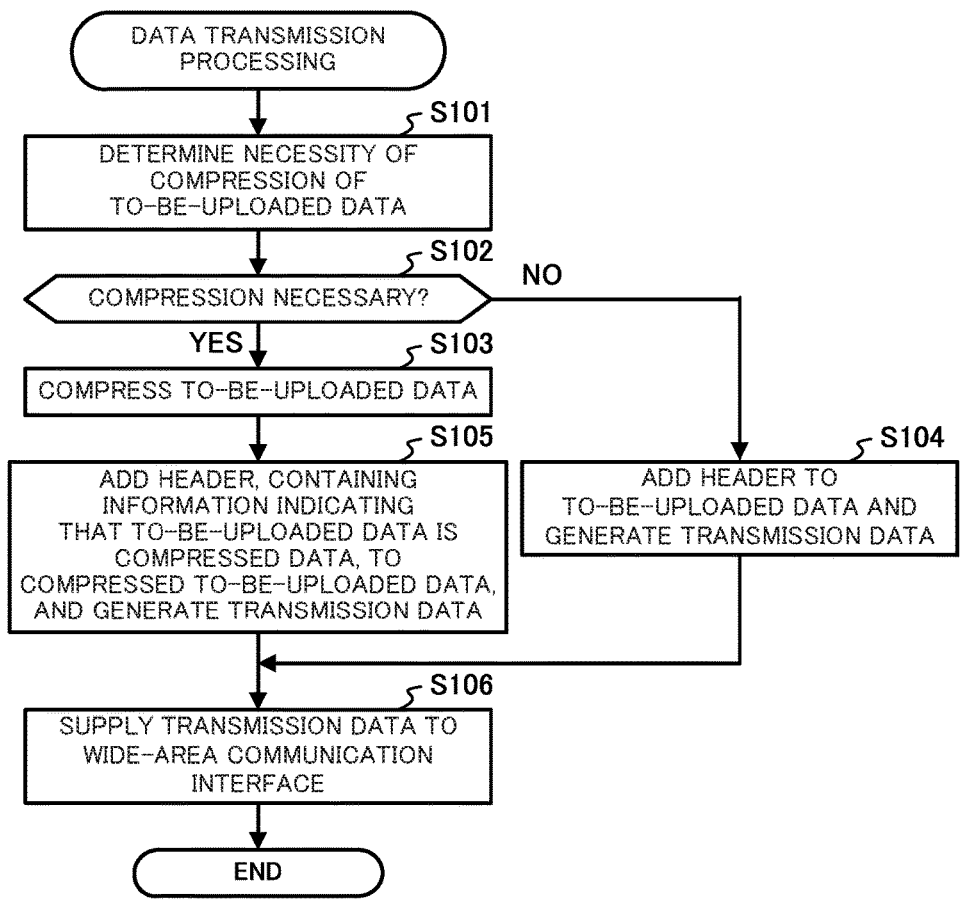
FIG. 7 is a flowchart illustrating a procedure of data transmission processing according to Embodiment 1.

FIG. 7 is a flowchart illustrating a procedure of the data transmission processing executed by the controller 13 of the client device 1. This data transmission processing is executed every time the application processor 130 generates to-be-uploaded data.

Figure 8:
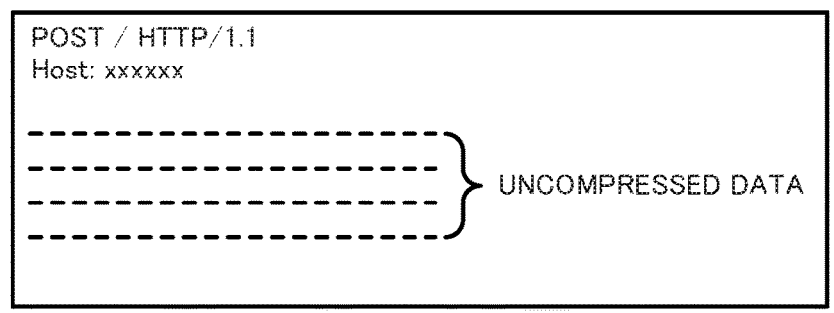
FIG. 8 is a diagram illustrating an example header added to uncompressed to-be-uploaded data in Embodiment 1.

First, the compression necessity determiner 131 determines the necessity of compression of the generated to-be-uploaded data as described above (step S101). Consequently, when the compression is necessary for the to-be-uploaded data (step S102; YES), the data compressor 132 compresses the to-be-uploaded data in the predetermined scheme (gzip in this embodiment) (step S103). Conversely, when the compression is unnecessary for the to-be-uploaded data (step S102; NO), the data sender 133 adds the header to the to-be-uploaded data thereby generating transmission data (step S104). FIG. 8 illustrates an example header in this case.

Figure 9:
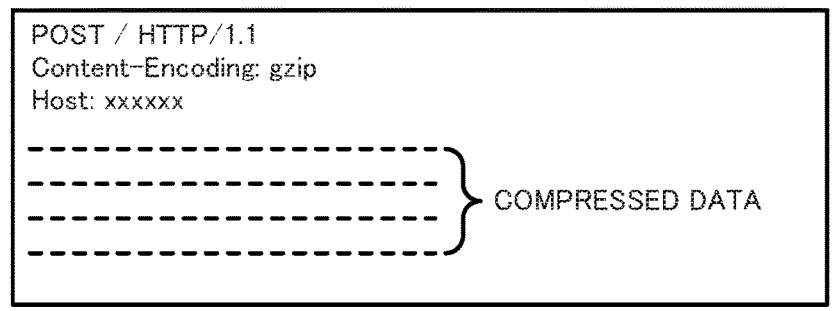
FIG. 9 is a diagram illustrating an example header added to compressed to-be-uploaded data in Embodiment 1.

In step S105 subsequent to step S103, the data sender 133 adds, to the compressed to-be-uploaded data the header that contains information indicating that the data is compressed data, thereby generating transmission data. FIG. 9 illustrates an example header in this case. Next, the data sender 133 supplies the generated transmission data to the wide-area communication interface 10 (step S106). More specifically, the data sender 133 executes processing of writing, in the transmission buffer of the wide-area communication interface 10, data having a predetermined size in sequence from the head of the transmission data.

As described above, according to the data communication system in Embodiment 1 of the present disclosure, the controller 13 of the client device 1 determines the necessity of compression of the to-be-uploaded data on the basis of the size of the to-be-uploaded data and the compression presence-absence time table 120 when transmitting the to-be-uploaded data to the server 2. At this time, the controller 13 determines the necessity of compression of the to-be-uploaded data so as to reduce the necessary time for the transmission processing by the controller 13.

Thereby, the necessary time for the transmission processing by the controller 13 is precisely reduced, reducing the load for the controller 13 (CPU) at the time of communication. Therefore, even if the CPU of the client device 1 does not have high performance, a delay in the main processing relating to the management of power and the control for each appliance 5 is suppressed.

Embodiment 2

Next, a description is given of a data communication system according to Embodiment 2 of the present disclosure. In the following description, the common structural component, and the like to the foregoing embodiment is denoted by the same reference numeral, and the description thereof is omitted.

Figure 10:
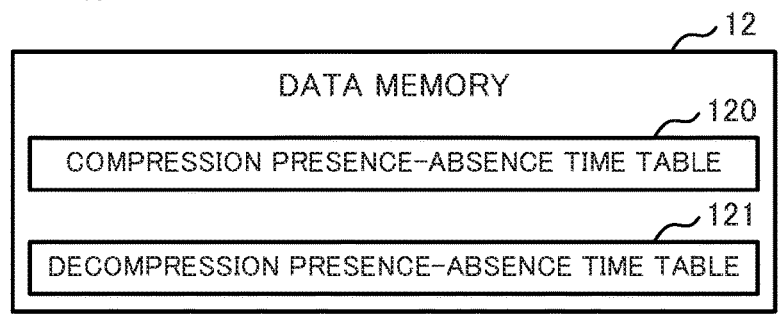
FIG. 10 is a diagram illustrating a table stored in a data memory included in a client device according to Embodiment 2 of the present disclosure.
Figures 11, 12:
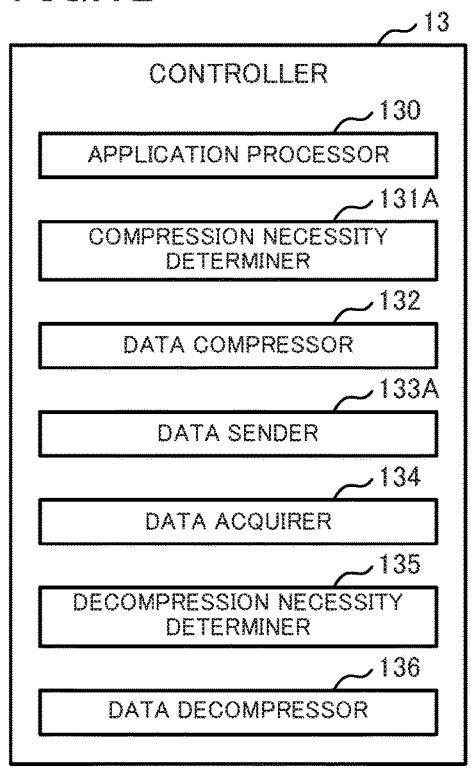
FIG. 11 is a diagram illustrating an example decompression presence-absence time table according to Embodiment 2.
FIG. 12 is a diagram illustrating a functional configuration of a controller included in the client device according to Embodiment 2.

As illustrated in FIG. 10, the data memory 12 included in the client device 1 according to this embodiment stores, in addition to the compression presence-absence time table 120, a decompression presence-absence time table 121. The decompression presence-absence time table 121 (second time table) is a data table that stores, for each data size predetermined step by step, the necessary times for the reception processing by the controller 13 when data is decompressed and is not decompressed. FIG. 11 illustrates an example decompression presence-absence time table 121 according to this embodiment. The example in FIG. 11 shows that the necessary time when the controller 13 receives data with a data size of 100 [KB] is C1 [ms] when the data is decompressed, and is D1 [ms] when the data is not decompressed.

In the decompression presence-absence time table 121 illustrated in FIG. 11, the data size corresponding to the processing time when data is decompressed (for example, 100 [KB] corresponding to C1 [ms]) is not a data size after compression but a data size before the compression.

As illustrated in FIG. 12, the controller 13 included in the client device 1 according to this embodiment includes, as unique functions to the present disclosure, the application processor 130, a compression necessity determiner 131A, the data compressor 132, a data sender 133A, the data acquirer 134, a decompression necessity determiner 135, and a data decompressor 136.

The compression necessity determiner 131A determines, like the compression necessity determiner 131 of Embodiment 1, the necessity of compression of the to-be-uploaded data generated by the application processor 130. In addition, the compression necessity determiner 131A determines the necessity of compression of to-be-downloaded data that will be downloaded from, when the detail of the to-be-uploaded data indicates a download request to the server 2, the server 2 in response to this request.

In this case, the compression necessity determiner 131A determines the necessity of compression of the to-be-downloaded data on the basis of the size thereof and the decompression presence-absence time table 121. When, for example, the size of the to-be-downloaded data is 100 [KB], and when C1 is smaller than D1 is satisfied, the compression necessity determiner 131A determines that the compression is necessary, and when C1 is greater than or equal to D1 is satisfied, the compression necessity determiner 131A determines that the compression is unnecessary. In this embodiment, the size of the to-be-downloaded data is determinable in accordance with the kind of the requested downloading data. Alternatively, the size of the requested downloading data may be specified by the application processor 130.

The data sender 133A executes, like the data sender 133 of Embodiment 1, processing of generating data (transmission data) that is the compressed or the uncompressed to-be-uploaded data to which a header is added, and sending the generated transmission data to the wide-area communication interface 10. In addition, the data sender 133A stores, when the compression necessity determiner 131A determines that the compression is necessary for the to-be-downloaded data, information requesting the compression of the downloading data (which is described later in detail) in the header of the transmission data.

When data (reception data) received by the wide-area communication interface 10 from the server 2 contains downloading data, the decompression necessity determiner 135 determines the necessity of decompression of this downloading data. When the header added to the downloading data contains information indicating that the data is compressed data, the decompression necessity determiner 135 determines that the decompression of the downloading data (that is, compressed downloading data) is necessary. Conversely, when the header does not contain the information indicating that the data is compressed data, the decompression necessity determiner 135 determines that the decompression of such downloading data is unnecessary.

When the decompression necessity determiner 135 determines that the decompression of the downloading data is necessary, the data decompressor 136 decompresses (restores) the downloading data in a predetermined scheme (decompression scheme corresponding to gzip in this embodiment).

Figure 13:
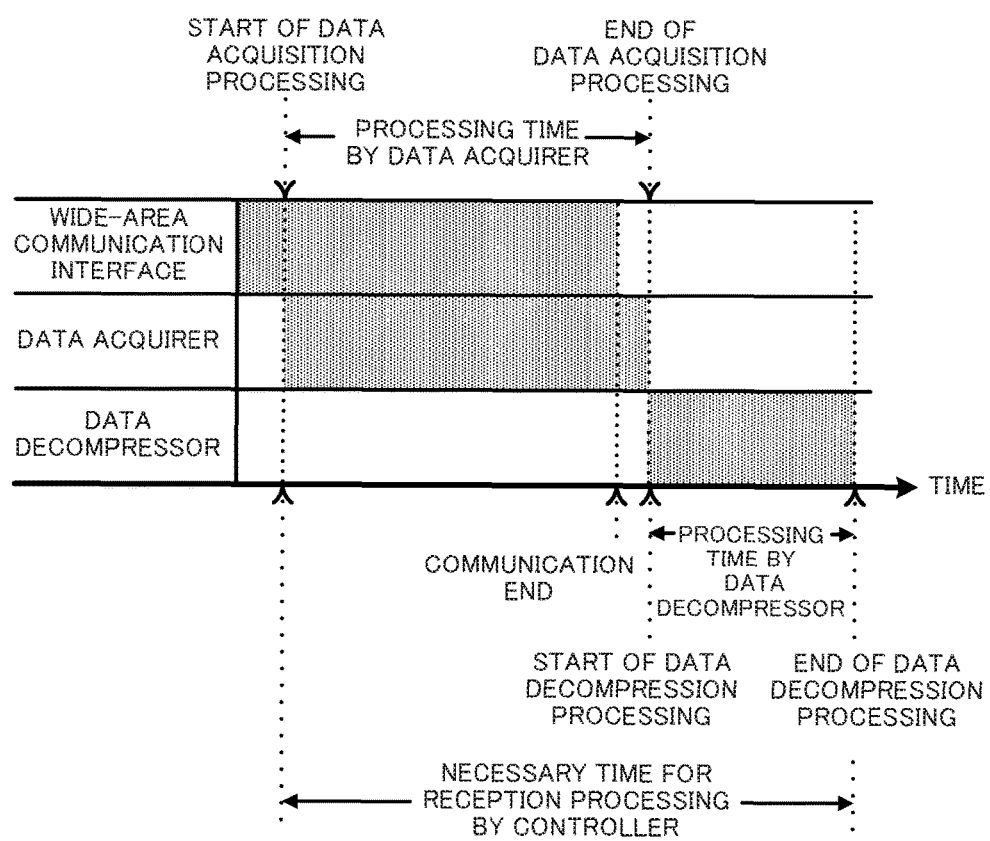
FIG. 13 is a diagram for describing a necessary time for reception processing by the controller when data is decompressed.

Here, a description is given of the necessary time for the reception processing by the controller 13 when decompressed downloading data by the server 2 is received. In this case, as illustrated in FIG. 13, first, the data acquirer 134 executes processing (data acquisition processing) of acquiring data (reception data) received by the wide-area communication interface 10 from the wide-area communication interface 10. In the data acquisition processing, the data acquirer 134 acquires, from the reception buffer of the wide-area communication interface 10, the reception data for every certain number of bytes in sequence. After the completion of the data acquisition processing, the data decompressor 136 starts data decompression processing.

The data decompressor 136 decompresses data (that is, compressed downloading data) that is the reception data acquired in the data acquisition processing and having the header eliminated. Next, when the data decompression processing is completed, the decompressed (that is, restored) downloading data is supplied to the application processor 130.

In this embodiment, the necessary time for the reception processing by the controller 13 when the compressed downloading data is received as described above is a time obtained by adding the necessary time for the data acquisition processing by the data acquirer 134 to the necessary time for the data decompression processing by the data decompressor 136.

Figure 14:
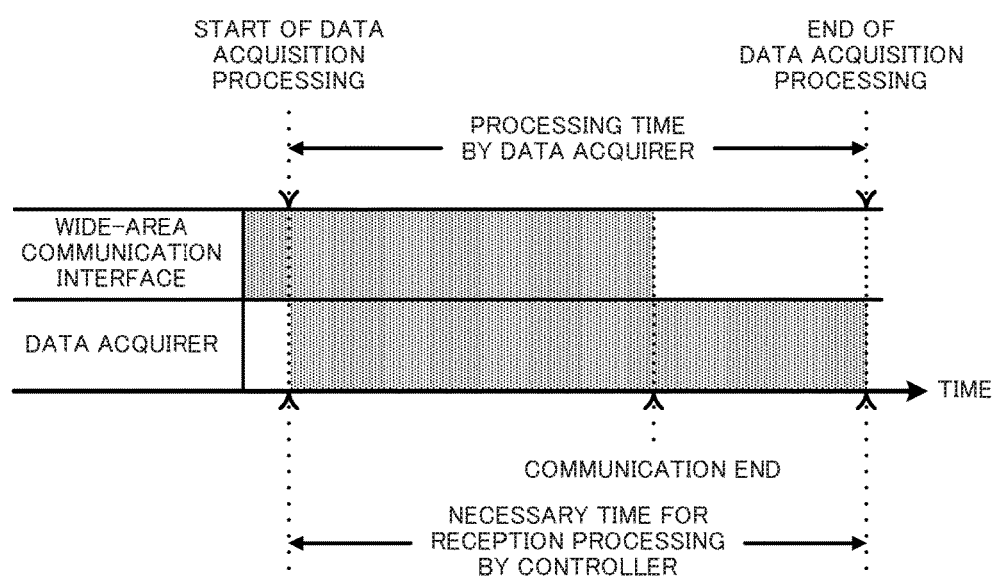
FIG. 14 is a diagram for describing a necessary time for the reception processing by the controller when data is not decompressed.

Next, a description is given of the necessary time for the reception processing by the controller 13 when downloading data that is not compressed by the server 2 is received. In this case, as illustrated in FIG. 14, when the data acquisition processing by the data acquirer 134 is completed, the data decompressor 136 does not execute the data decompression processing, but data, from which the header is removed, acquired by the data acquirer 134 is supplied to the application processor 130 as the downloading data.

According to this embodiment, the necessary time for the reception processing by the controller 13 when uncompressed downloading data is received as described above is equal to the necessary time for the data acquisition processing by the data acquirer 134.

Figure 15:
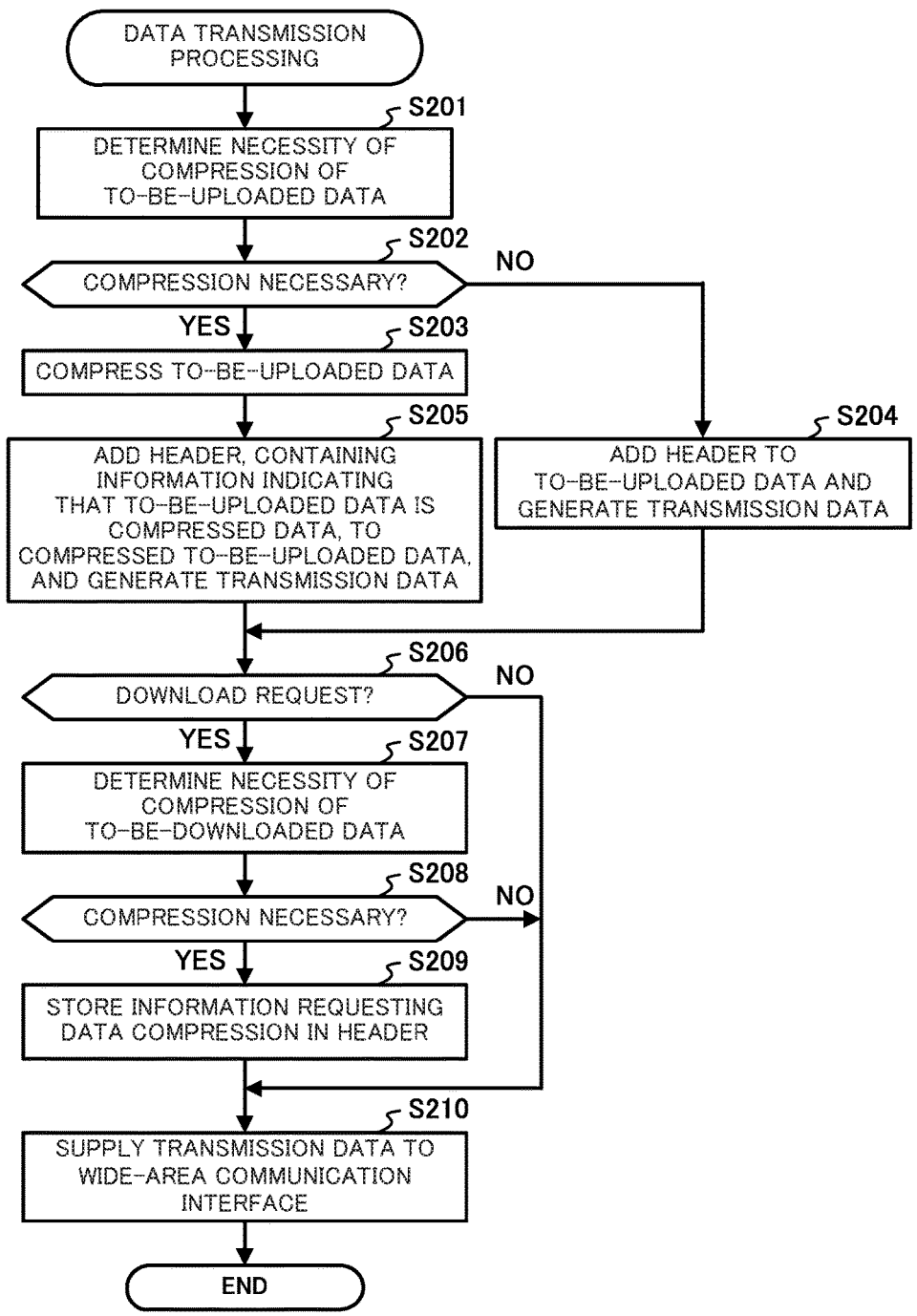
FIG. 15 is a flowchart illustrating a procedure of data transmission processing according to Embodiment 2.

FIG. 15 is a flowchart illustrating a procedure of the data transmission processing executed by the controller 13 of the client device 1 according to this embodiment. This data transmission processing is executed every time the application processor 130 generates to-be-uploaded data.

First, the compression necessity determiner 131A determines the necessity of compression of the generated to-be-uploaded data (step S201). Consequently, when the compression of the to-be-uploaded data is necessary (step S202; YES), the data compressor 132 compresses the to-be-uploaded data in the predetermined scheme (gzip in this embodiment) (step S203). Conversely, when the compression of the to-be-uploaded data is unnecessary (step S202; NO), the data sender 133A adds a header to the to-be-uploaded data thereby generating transmission data (step S204).

In step S205 subsequent to step S203, the data sender 133A adds, to the compressed to-be-uploaded data a header containing information indicating that the data is compressed data, thereby generating transmission data.

The compression necessity determiner 131A determines whether the content of the to-be-uploaded data indicates a download request to the server 2 (step S206). When the content of the to-be-uploaded data does not indicate the download request (step S206; NO), the controller 13 progresses the processing to step S210.

Conversely, when the content of the to-be-uploaded data indicates the download request (step S206; YES), the compression necessity determiner 131A determines the necessity of compression of to-be-downloaded data that will be downloaded from the server 2 in response to the request as described above (step S207). When the compression necessity determiner 131A determines that the compression of the to-be-downloaded data is unnecessary (step S208; NO), the controller 13 progresses the processing to step S210.

Figure 16:
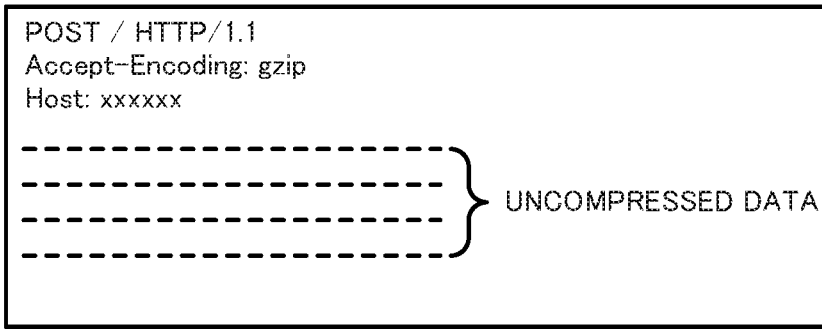
FIG. 16 is a diagram illustrating a first example, an example header added to to-be-uploaded data when a compression is requested in Embodiment 2.
Figure 17:
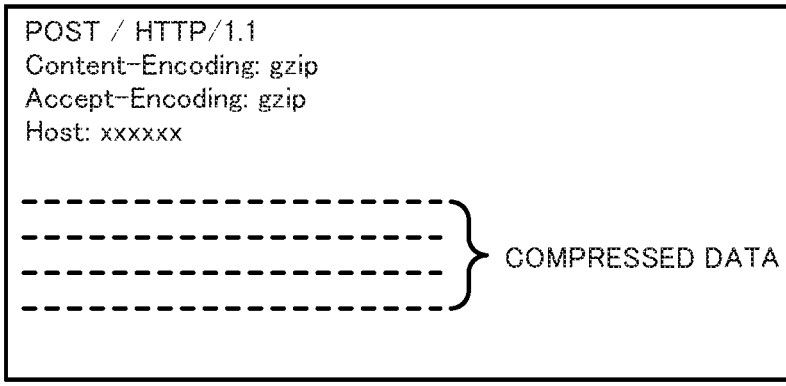
FIG. 17 is a diagram illustrating a second example, an example header added to to-be-uploaded data when a compression is requested in Embodiment 2.

Conversely, when the compression necessity determiner 131A determines that the compression of the to-be-downloaded data is necessary (step S208; YES), the data sender 133A stores information requesting the compression of downloading data in the header of the transmission data generated in step S204 or S205 (step S209). FIG. 16 and FIG. 17 illustrate example headers in this case. FIG. 16 illustrates an example when the to-be-uploaded data is uncompressed, while FIG. 17 illustrates an example when the to-be-uploaded data is compressed.

Next, the data sender 133A supplies the generated transmission data to the wide-area communication interface 10 (step S210).

Figure 18:
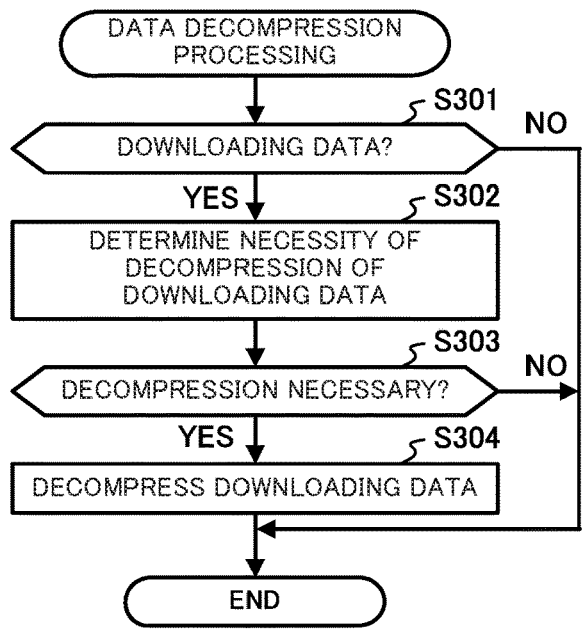
FIG. 18 is a flowchart illustrating a procedure of data decompression processing according to Embodiment 2.

FIG. 18 is a flowchart illustrating a procedure of the data decompression processing executed by the controller 13 of the client device 1 according to this embodiment. This data decompression processing is executed every time the data acquirer 134 completes the acquisition of the reception data from the wide-area communication interface 10.

First, the decompression necessity determiner 135 determines whether the reception data contains downloading data (step S301). When the reception data contains no downloading data (step S301; NO), the data decompression processing ends in this case.

Figure 19:
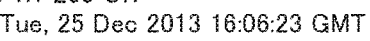
FIG. 19 is a diagram illustrating an example header added to uncompressed downloading data in Embodiment 2.
Figure 20:
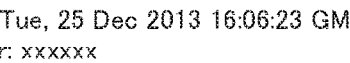
FIG. 20 is a diagram illustrating an example header added to compressed downloading data in Embodiment 2.

Conversely, when the reception data contains the downloading data (step S301; YES), the decompression necessity determiner 135 determines the necessity of decompression of the downloading data (step S302). The decompression necessity determiner 135 determines the necessity of decompression of the downloading data on the basis of whether the header added to the downloading data contains information (for example, information indicating a compression scheme) indicating that the data is compressed data. That is, as illustrated in FIG. 19, when the header contains no information indicating that the data is compressed data, the decompression necessity determiner 135 determines that the decompression of the downloading data is unnecessary. Conversely, as illustrated in FIG. 20, when the header contains the information indicating that the data is compressed data, the decompression necessity determiner 135 determines that the decompression of the downloading data is necessary.

When the decompression of the downloading data is unnecessary (step S303; NO), the data decompression processing ends in this case. Conversely, when the decompression of the downloading data is necessary (step S303; YES), the data decompressor 136 decompresses the downloading data in a predetermined scheme (decompression scheme corresponding to gzip in this embodiment) (step S304). In this case, the decompressed (that is, restored) downloading data is supplied to the application processor 130.

As described above, according to the data communication system in Embodiment 2 of the present disclosure, the client device 1 has the equivalent function to that of the client device 1 in Embodiment 1, and further determines, when requesting downloading data to the server 2, the necessity of compression of downloading data (to-be-downloaded data) that will be downloaded from the server 2 in response to the request. At this time, the controller 13 of the client device 1 determines the necessity of compression of the to-be-downloaded data so as to further reduce the necessary time for the reception processing by the controller 13 (CPU) on the basis of the size of the to-be-downloaded data and the decompression presence-absence time table 121.

For this reason, the necessary time for the transmission processing by the controller 13 and that for the reception processing thereof are reduced precisely. Therefore, a load for the controller 13 (CPU) at the time of data transmission and data reception is reduced.

Embodiment 3

Next, a description is given of a data communication system according to Embodiment 3 of the present disclosure. In the following description, the common structural component, and the like to the foregoing embodiments is denoted by the same reference numeral, and the description thereof is omitted.

In Embodiment 1, the data compression scheme when the data compressor 132 compresses the to-be-uploaded data is stationary (for example, gzip). In Embodiment 3, however, the data compressor 132 compresses to-be-uploaded data in the selected compression scheme by the compression necessity determiner 131 among the multiple different compression schemes.

Figure 21:
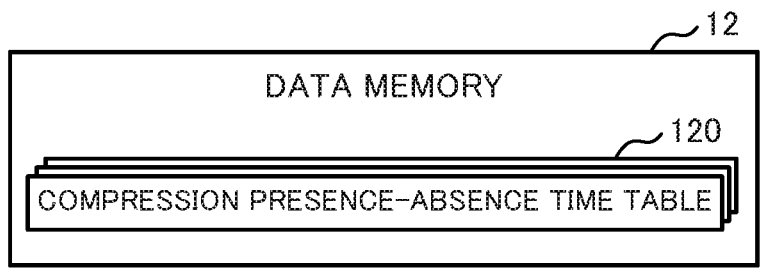
FIG. 21 is a diagram illustrating a table stored in a data memory included in a client device according to Embodiment 3 of the present disclosure.

The functional structure of the controller 13 included in the client device 1 according to this embodiment is the same as that of the controller 13 of Embodiment 1 (see FIG. 4). In addition, as illustrated in FIG. 21, the data memory 12 included in the client device 1 according to this embodiment stores the compression presence-absence time table 120 for each of the multiple different compression schemes. According to this embodiment, in addition to, for example, the compression presence-absence time table 120 corresponding to gzip (see FIG. 3), the compression presence-absence time tables 120 corresponding to compression schemes, such as "compress" and "deflate", are also stored in the data memory 12.

The compression necessity determiner 131 compares, for the record corresponding to the size of the to-be-uploaded data in the compression presence-absence time table 120 similar to Embodiment 1, the processing time when data is compressed with the processing time when data is uncompressed. In this embodiment, however, the compression necessity determiner 131 performs such a comparison for all compression presence-absence time tables 120. Next, when the processing time when data is compressed is shorter than the processing time when data is uncompressed is satisfied for the record corresponding to the size of the to-be-uploaded data in at least one of the compression presence-absence time tables 120, the compression necessity determiner 131 determines that the compression of the to-be-uploaded data is necessary. In addition, when a condition, that the processing time when data is compressed is shorter than the processing time when data is uncompressed, is satisfied for the record corresponding to the size of the to-be-uploaded data in the multiple compression presence-absence time tables 120, the compression necessity determiner 131 selects among the records, as a currently applied compression scheme, the compression scheme with the shortest processing time when data is compressed.

Figure 22:
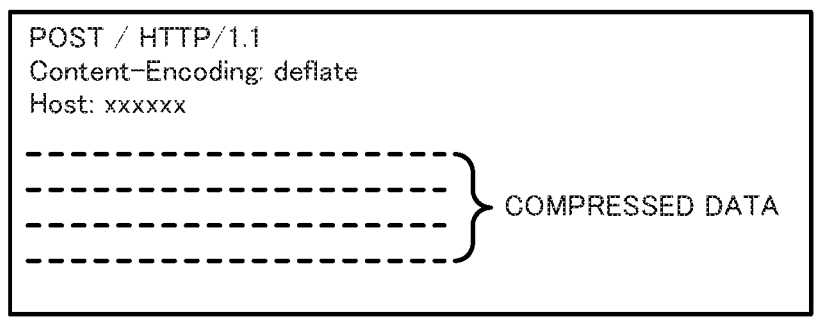
FIG. 22 is a diagram illustrating an example header added to compressed to-be-uploaded data in Embodiment 3.

The data compressor 132 compresses the to-be-uploaded data in the selected compression scheme by the compression necessity determiner 131. When the data compressor 132 has compressed the data, the data sender 133 adds, to the compressed to-be-uploaded data a header that contains information indicating the selected compression scheme by the compression necessity determiner 131, thereby generating transmission data. FIG. 22 illustrates an example header in this case.

As described above, according to the data communication system in Embodiment 3 of the present disclosure, the client device 1 compresses the to-be-uploaded data in the compression scheme selected as appropriate among the multiple compression schemes. Thus, a further reduction of the necessary time for the transmission processing by the controller 13 is accomplished.

Embodiment 4

Next, a description is given of a data communication system according to Embodiment 4 of the present disclosure. In the following description, the common structural component, and the like to the foregoing embodiments is denoted by the same reference numeral, and the description thereof is omitted.

In Embodiment 2, when the client device 1 requests a compression of downloading data to the server 2, the compression scheme for the downloading data by the server 2 is stationary (for example, gzip) According to Embodiment 4, however, the client device 1 specifies, to the server 2, a selected compression scheme among the multiple compression schemes.

Figure 23:
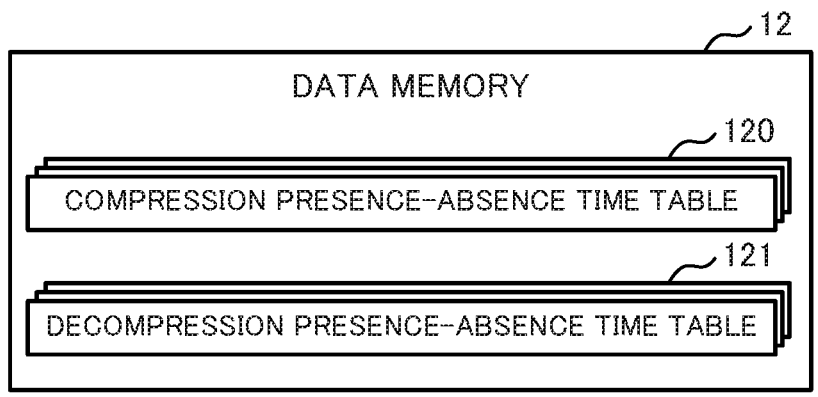
FIG. 23 is a diagram illustrating a table stored in a data memory included in a client device according to Embodiment 4 of the present disclosure.

The functional configuration of the controller 13 included in the client device 1 according to this embodiment is the same as that of the controller 13 of Embodiment 2 (see FIG. 12). In addition, as illustrated in FIG. 23, the data memory 12 included in the client device 1 according to this embodiment stores the compression presence-absence time table 120 for each of the multiple different compression schemes, and further the decompression presence-absence time table 121 for each of the multiple different compression schemes. The compression presence-absence time table 120 for each of the multiple different compression schemes is utilized to compress the to-be-uploaded data in the compression scheme selected as appropriate among the multiple compression schemes similar to Embodiment 3.

According to this embodiment, in addition to, for example, the decompression presence-absence time table 121 corresponding to gzip (see FIG. 11), the decompression presence-absence time tables 121 corresponding to the compression schemes, such as "compress" and "deflate", are also stored in the data memory 12.

The compression necessity determiner 131A of this embodiment compares, for the record corresponding to the size of to-be-downloaded data in the decompression presence-absence time table 121 similar to Embodiment 2 when the detail of the to-be-uploaded data indicates a download request to the server 2, the processing time when data is decompressed and the processing time when data is not decompressed. In this embodiment, however, the compression necessity determiner 131A performs such a comparison for all decompression presence-absence time tables 121. Next, when the processing time when data is decompressed is shorter than the processing time when data is not decompressed is satisfied for the record corresponding to the size of the to-be-downloaded data in at least one of the decompression presence-absence time tables 121, the compression necessity determiner 131A determines that the compression of the to-be-downloaded data is necessary.

In addition, when the condition, that the processing time when data is decompressed is shorter than the processing time when data is not decompressed, is satisfied for the record corresponding to the size of the to-be-downloaded data in the multiple decompression presence-absence time tables 121, the compression necessity determiner 131A selects among the records, as a currently applied compression scheme, the compression scheme with the shortest processing time when data is decompressed.

Figure 24:
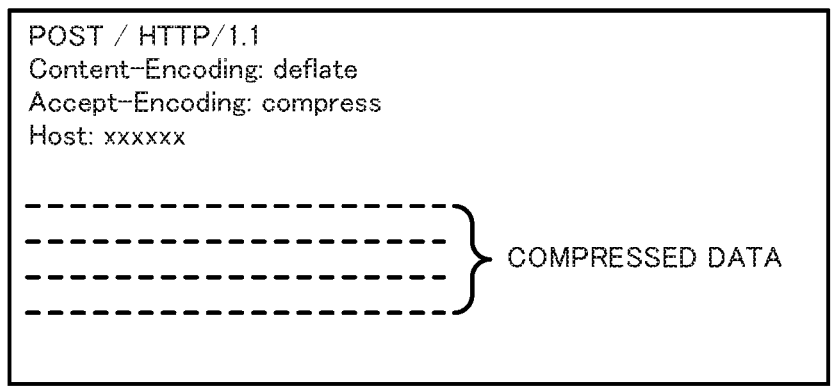
FIG. 24 is a diagram illustrating an example header added to compressed to-be-uploaded data in Embodiment 4.

When the compression necessity determiner 131A determines that the compression of the to-be-downloaded data is necessary, the data sender 133A stores information indicating the selected compression scheme by the compression necessity determiner 131A in a header of the transmission data. FIG. 24 illustrates an example header in this case. The example in FIG. 24 shows that the to-be-uploaded data has been compressed by the scheme that is "deflate", and a request of compression of the downloading data by the scheme that is "compress" to the server 2.

When the server 2 compresses downloading data in the specified compression scheme by the client device 1, the server 2 stores information indicating the compression scheme in a header added to the compressed downloading data.

When the header added to the downloading data from the server 2 contains the information indicating the compression scheme, the decompression necessity determiner 135 determines that the decompression of the downloading data is necessary, and notifies the data decompressor 136 of the compression scheme. The data decompressor 136 decompresses the downloading data in the notified compression scheme by the decompression necessity determiner 135.

As described above, according to the data communication system in Embodiment 4 of the present disclosure, the client device 1 has the equivalent function to those of the client devices 1 according to Embodiment 2 and Embodiment 3, and is further capable of specifying, to the server 2, the compression scheme selected as appropriate among the multiple compression schemes. Thus, a further reduction of the necessary time for the transmission processing and for the reception processing by the controller 13 is accomplished.

Embodiment 5

Next, a description is given of a data communication system according to Embodiment 5 of the present disclosure. In the following description, the common structural component, and the like to the foregoing embodiments is denoted by the same reference numeral, and the description thereof is omitted.

The client device 1 in this embodiment operates in either one of the two modes that are an actual operation mode and a test operation mode. At the time of the operation in the actual operation mode, the client device 1 in this embodiment accomplishes the equivalent function to that of the client device 1 in Embodiment 3.

The client device 1 in this embodiment constructs the compression presence-absence time table 120 (see FIG. 21) for each of the multiple different compression schemes at the time of the operation in the test operation mode. This is described below in more detail.

Figure 25:
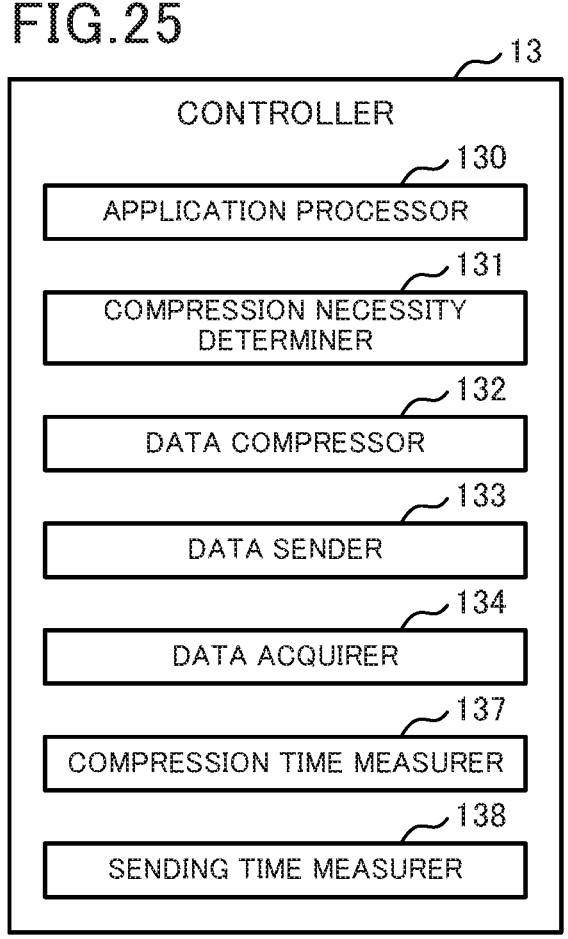
FIG. 25 is a diagram illustrating a functional configuration of a controller included in a client device according to Embodiment 5.

As illustrated in FIG. 25, the controller 13 included in the client device 1 according to this embodiment includes the application processor 130, the compression necessity determiner 131, the data compressor 132, the data sender 133, the data acquirer 134, a compression time measurer 137, and a sending time measurer 138.

On the condition that the operation mode is the test operation mode, the compression time measurer 137 measures a necessary time from the start of the compression processing for the to-be-uploaded data by the data compressor 132 to the end of this processing, that is, the processing time by the data compressor 132. Note that the user is capable of changing the operation of the client device 1 between the test operation mode and the actual operation mode through, for example, an operation given to a terminal device like a tablet type personal computer.

On the condition that the operation mode is the test operation mode, the sending time measurer 138 measures a necessary time from the start of the sending processing for the transmission data by the data sender 133 to the end of this processing, that is, the processing time by the data sender 133.

In the test operation mode, the user is capable of specifying, through the above terminal device, respective test parameters, such as the kind of the to-be-uploaded data to be generated by the application processor 130, the presence or absence of compression, and the compression scheme. Note that the compression necessity determiner 131 is deactivated in the test operation mode. In addition, when the presence of compression is specified by the above parameter, the data compressor 132 compresses the to-be-uploaded data in the specified compression scheme.

When the user instructs the execution of a test, the client device 1 operates to transmit the generated to-be-uploaded data by the application processor 130 to the server 2 on the basis of the respective parameters specified as described above. The controller 13 generates a record containing the data size, the processing time when data is compressed, and the processing time when data is uncompressed on the basis of the processing time by the data compressor 132 and/or the processing time by the data sender 133 that are measured as described above through such an operation, and the size of the to-be-uploaded data. In addition, the controller 13 registers the generated record in the compression presence-absence time table 120 corresponding to the specified compression scheme.

By repeating the above test while changing the respective parameters, the compression presence-absence time table 120 for each of the multiple different compression schemes as illustrated in FIG. 21 is constructed.

As described above, according to the data communication system in Embodiment 5 of the present disclosure, the compression presence-absence time table 120 for each of the multiple different compression schemes is constructed using data obtained by actually operating the client device 1 (the processing time by the data compressor 132, and the processing time by the data transmitter 133). The compression presence-absence time tables 120 constructed as described above can be utilized in the actual operation mode, and thereby the determination precision for the necessity of compression by the compression necessity determiner 131 improves. Consequently, a further reduction of the necessary time for the transmission processing by the controller 13 is accomplished.

Embodiment 6

Next, a description is given of a data communication system according to Embodiment 6 of the present disclosure. In the following description, the common structural component, and the like to the foregoing embodiments is denoted by the same reference numeral, and the description thereof is omitted.

A client device 1 according to this embodiment operates, like the client device 1 of Embodiment 5, in either one of the two modes that are the actual operation mode and the test operation mode. At the time of the operation in the actual operation mode, the client device 1 of this embodiment accomplishes the equivalent function to that of the client device 1 in Embodiment 4.

At the time of the operation in the test operation mode, the client device 1 of this embodiment constructs, as illustrated in FIG. 23, the compression presence-absence time table 120 for each of the multiple different compression schemes and the decompression presence-absence time table 121 for each of the multiple different compression schemes. This is described below in more detail.

Figure 26:
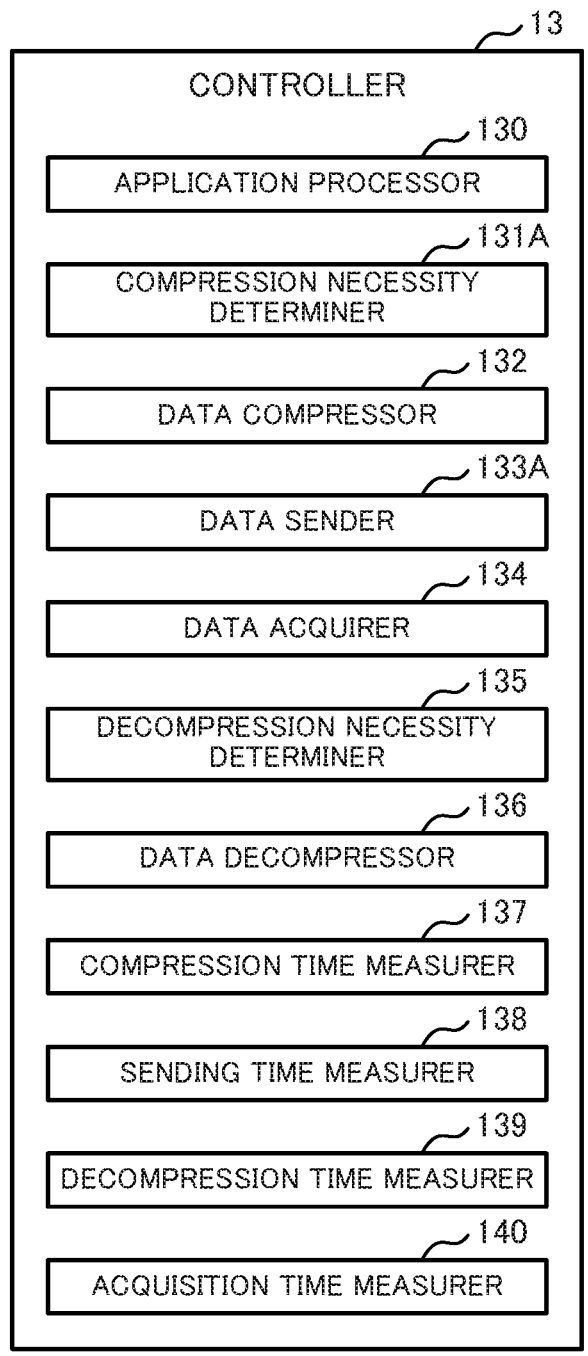
FIG. 26 is a diagram illustrating a functional configuration of a controller included in a client device according to Embodiment 6.

As illustrated in FIG. 26, the controller 13 included in the client device 1 according to this embodiment includes the application processor 130, the compression necessity determiner 131A, the data compressor 132, the data sender 133A, the data acquirer 134, the decompression necessity determiner 135, the data decompressor 136, the compression time measurer 137, the sending time measurer 138, a decompression time measurer 139, and an acquisition time measurer 140.

On the condition that the operation mode is the test operation mode, the decompression time measurer 139 measures a time necessary from the start of the decompression processing of the downloading data by the data decompressor 136 to the end of this processing, that is, the processing time by the data decompressor 136. Similar to Embodiment 5, the user is capable of changing the operation of the client device 1 between the test operation mode and the actual operation mode through, for example, an operation given to a terminal device like a tablet type personal computer.

On the condition that the operation mode is the test operation mode, the acquisition time measurer 140 measures the necessary time from the start of the acquisition processing of the reception data by the data acquirer 134 to the end of this processing, that is, the processing time by the data acquirer 134.

In the test operation mode, similar to Embodiment 5, the user is capable of specifying, through the above terminal device, respective test parameters, such as the size of the to-be-uploaded data to be generated by the application processor 130, the presence or absence of compression, and the compression scheme, for constructing the compression presence-absence time table 120. In addition, in this embodiment, the user is also capable of specifying, through the above terminal device, respective test parameters, such as the kind of downloading data requested to the server 2, the presence or absence of compression request, and a compression scheme to be requested, for constructing the decompression presence-absence time table 121.

In the test operation mode, the compression necessity determiner 131A is deactivated. In addition, similar to Embodiment 5, when the presence of compression is specified by the above parameter, the data compressor 132 compresses the to-be-uploaded data in the specified compression scheme.

When the user instructs the execution of the test to construct the compression presence-absence time table 120, similar to Embodiment 5, the controller 13 generates a record containing the data size, the processing time when data is compressed, and the processing time when data is uncompressed on the basis of the processing time by the data compressor 132 and/or the processing time by the data sender 133A that are measured, and the size of the to-be-uploaded data. Next, the controller 13 registers the generated record in the compression presence-absence time table 120 corresponding to the specified compression scheme.

By repeating the above test to construct the compression presence-absence time table 120 while changing the respective parameters, the compression presence-absence time table 120 for each of the multiple different compression schemes illustrated in FIG. 23 is constructed.

In addition, when the user instructs the execution of the test to construct the decompression presence-absence time table 121, the client device 1 performs, on the basis of the respective specified parameters, an operation of transmitting, to the server 2, the to-be-uploaded data for requesting the downloading data, and an operation of receiving the downloading data sent from the server 2 in response to the request.

The controller 13 generates a record containing the data size, the processing time when data is decompressed, and the processing time when data is not decompressed on the basis of the processing time by the data acquirer 134 and/or the processing time by the data decompressor 136 that are measured as described above through such operations, the presence or absence of the compression of the downloading data, the compression scheme of the downloading data, and the size of the (uncompressed) downloading data. Next, the controller 13 registers the generated record in the decompression presence-absence time table 121 corresponding to the specified compression scheme.

By repeating the above test to construct the decompression presence-absence time table 121 while changing the respective parameters, the decompression presence-absence time table 121 for each of the multiple different compression schemes illustrated in FIG. 23 is constructed.

As described above, according to the data communication system in Embodiment 6 of the present disclosure, the same effect as that of the data communication system in Embodiment 5 is accomplished. In addition, according to the data communication system in Embodiment 6, the decompression presence-absence time table 121 for each of the multiple different compression schemes is constructed using data obtained by actually operating the client device 1 (the processing time by the data acquirer 134 and the processing time by the data decompressor 136). The decompression presence-absence time tables 121 constructed as described above can be utilized in the actual operation mode, and thereby the determination precision of the necessity of compression of the to-be-downloaded data by the compression necessity determiner 131A improves. Consequently, a further reduction of the necessary time for the reception processing by the controller 13 is accomplished.

Note that the present disclosure is not limited to each of the above embodiments, and various modifications without departing from the scope of the present disclosure can be made.

For example, when the data memory 12 stores the compression presence-absence time table 120 for each of the multiple different compression schemes, and the decompression presence-absence time table 121 for each of the multiple different compression schemes, the processing time when data is uncompressed and the processing time when data is not decompressed are defined by not the compression scheme but the data size. Hence, common processing times for such cases may be shared and stored.

Moreover, in each of the aforementioned embodiments, a program for execution by the client device 1 may be stored and distributed in a computer-readable recording medium such as a compact disc read-only memory (CD-ROM), a digital versatile disc (DVD), a magneto-optical disk (MO), a universal serial bus (USB) memory, and a memory card. By installation of this program in a dedicated or general-purpose computer, the computer can function as the client device 1 of each of the aforementioned embodiments.

The above-described program may be stored on a disk device or the like of a server device on a communication network such as the Internet to enable the program to be downloaded to the computer, for example by superimposing the program onto a carrier wave. Moreover, the aforementioned processing can be achieved even by execution while the program is transferred through the communication network. Furthermore, the aforementioned processing can be achieved by executing all or part of the program on the server device, and executing the program while sending and receiving by the computer the information relating to such processing through the communication network.

Moreover, if the aforementioned functions are executed by sharing the functions between an operating system (OS) and application programs, or are executed by both the OS and the application programs in cooperation with each other, the non-OS portion alone may be stored and distributed in the aforementioned recording medium, or alternatively, may be, for example, downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitably applicable to data communication techniques between a client device and a server.

REFERENCE SIGNS LIST

1 Client device
2 Server
3 Router
4 Power sensor
5 Appliance
10 Wide-area communication interface
11 Appliance communication interface
12 Data memory
13 Controller
14 Bus
120 Compression presence-absence time table
121 Decompression presence-absence time table
130 Application processor
131, 131A Compression necessity determiner
132 Data compressor
133, 133A Data sender
134 Data acquirer
135 Decompression necessity determiner
136 Data decompressor
137 Compression time measurer
138 Sending time measurer
139 Decompression time measurer
140 Acquisition time measurer

The invention claimed is:

1. A client device comprising:
a communication interface configured to communicate with a server; and
a client-device central processing unit (CPU) configured to execute a program stored in a client-device memory to provide:
a compression necessity determiner configured
to determine a necessity of compression of to-be-uploaded data to be uploaded to the server, and
to determine a necessity of compression of to-be-downloaded data to be downloaded from the server in response to a download request when content of the to-be-uploaded data indicates the download request to the server;
a data compressor configured to compress the to-be-uploaded data in a predetermined scheme when the compression necessity determiner determines that the compression of the to-be-uploaded data is necessary;
a data acquirer configured to acquire, from the communication interface, data transmitted from the server;
a decompression necessity determiner configured to determine a necessity of decompression of downloading data when the data transmitted from the server contains the downloading data;
a data decompressor configured to decompress the downloading data in a predetermined scheme when the decompression necessity determiner determines that the decompression of the downloading data is necessary; and
a data sender configured
to send, when the compression necessity determiner determines that the compression of the to-be-uploaded data is unnecessary, to the communication interface data in which a header is added to the to-be-uploaded data,
to send, when the compression necessity determiner determines that the compression of the to-be-uploaded data is necessary, to the communication interface data in which a header is added to the to-be-uploaded data compressed by the data compressor, the header containing information indicating that the to-be-uploaded data is compressed data, and
to store, in the header, information requesting compression of data when the compression necessity determiner determines that the compression of the to-be-downloaded data is necessary,
wherein the compression necessity determiner is configured to determine the necessity of compression of the to-be-downloaded data based on a size of the to-be-downloaded data and a decompression presence-absence time table in which a data size, a total processing time obtained by adding a processing time by the data decompressor to a processing time by the data acquirer when the downloading data is decompressed, and a processing time by the data acquirer when the downloading data is not decompressed are associated with one another.

2. The client device according to claim 1, wherein the compression necessity determiner is configured to determine the necessity of compression of the to-be-uploaded data based on a size of the to-be-uploaded data and a compression presence-absence time table in which a data size, a total processing time obtained by adding a processing time by the data compressor to a processing time by the data sender when the to-be-uploaded data is compressed, and
a processing time by the data sender when the to-be-uploaded data is uncompressed are associated with one another.

3. The client device according to claim 2, wherein:
the compression presence-absence time table is prepared for each of a plurality of different compression schemes;
the compression necessity determiner is further configured to select a compression scheme when the compression is necessary; and
when the compression necessity determiner determines that the compression of the to-be-uploaded data is necessary,
the data compressor is configured to compress the to-be-uploaded data in the selected compression scheme, and
the data sender is configured to send, to the communication interface, data in which a header is added to the to-be-uploaded data compressed by the data compressor, the header containing information indicating the selected compression scheme.

4. The client device according to claim 1, wherein the central processing unit (CPU) executing the program stored in the memory also provides:
a compression time measurer configured to measure a processing time by the data compressor; and
a sending time measurer configured to measure a processing time by the data sender.

5. The client device according to claim 1, wherein:
the decompression presence-absence time table is prepared for each of a plurality of different compression schemes;
the compression necessity determiner is further configured to select a compression scheme when the compression of the to-be-downloaded data is necessary; and
the data sender is configured to store, in the header, information indicating the selected compression scheme when the compression necessity determiner determines that the compression of the to-be-downloaded data is necessary.

6. The client device according to claim 1, wherein the central processing unit (CPU) executing the program stored in the memory also provides:
    a decompression time measurer configured to measure a processing time by the data decompressor; and
    an acquisition time measurer configured to measure a processing time by the data acquirer.

7. A data communication system comprising:
    the client device according to claim 1; and
    a server configured to connect with the client device via a communication network.

8. A data communication method executable by a client-device central processing unit (CPU) comprising:
    determining, in a client device, by a compression necessity determiner
        a necessity of compression of to-be-uploaded data to be uploaded to a server, and
        a necessity of compression of to-be-downloaded data to be downloaded from the server in response to a download request when content of the to-be-uploaded data indicates the download request to the server;
    compressing by a data compressor the to-be-uploaded data in a predetermined scheme when the compression of the to-be-uploaded data is determined to be necessary by the compression necessity determiner;
    acquiring by a data acquirer, from an communication interface configured to communicate with the server, data transmitted from the server;
    determining by a decompression necessity determiner a necessity of decompression of downloading data when the data transmitted from the server contains the downloading data;
    decompressing by a data decompressor the downloading data in a predetermined scheme when the decompression of the downloading data is determined to be necessary by the decompression necessity determiner;
    sending by a data sender to the communication interface configured
        when the compression of the to-be-uploaded data is determined to be unnecessary by the compression necessity determiner, data in which a header is added to the to-be-uploaded data, and
        when the compression of the to-be-uploaded data is determined to be necessary by the compression necessity determiner, data in which a header is added to the to-be-uploaded data that is compressed by the data compressor, the header containing information indicating that the to-be-uploaded data is compressed data; and
    storing by the data sender, in the header, information requesting compression of data when the compression of the to-be-downloaded data is determined to be necessary by the compression necessity determiner,
    wherein the necessity of compression of the to-be-downloaded data is determined by the compression necessity determiner based on a size of the to-be-downloaded data and a decompression presence-absence time table in which a data size, a total processing time obtained by adding a processing time by the data decompressor to a processing time by the data acquirer when the downloading data is decompressed, a processing time by the data acquirer when the downloading data is not decompressed are associated with one another.

9. A non-transitory computer-readable recording medium recording a program for causing a client-device computer to function as:
    a compression necessity determiner configured to, in a client device,
        determine a necessity of compression of to-be-uploaded data to be uploaded to a server, and
        determine a necessity of compression of to-be-downloaded data to be downloaded from the server in response to a download request when content of the to-be-uploaded data indicates the download request to the server;
    a data compressor configured to compress the to-be-uploaded data in a predetermined scheme when the compression necessity determiner determines that the compression of the to-be-uploaded data is necessary;
    a data acquirer configured to acquire, from an communication interface configured to communicate with the server, data transmitted from the server;
    a decompression necessity determiner configured to determine a necessity of decompression of downloading data when the data transmitted from the server contains the downloading data;
    a data decompressor configured to decompress the downloading data in a predetermined scheme when the decompression necessity determiner determines that the decompression of the downloading data is necessary; and
    a data sender configured to
        send, when the compression necessity determiner determines that the compression of the to-be-uploaded data is unnecessary, to the communication interface, data in which a header is added to the to-be-uploaded data,
        send, when the compression necessity determiner determines that the compression of the to-be-uploaded data is necessary, to the communication interface data in which a header is added to the to-be-uploaded data compressed by the data compressor, the header containing information indicating that the to-be-uploaded data is compressed data, and
        store, in the header, information requesting compression of data when the compression necessity determiner determines that the compression of the to-be-downloaded data is necessary,
    wherein the compression necessity determiner is configured to determine the necessity of compression of the to-be-downloaded data based on a size of the to-be-downloaded data and a decompression presence-absence time table in which a data size, a total processing time obtained by adding a processing time by the data decompressor to a processing time by the data acquirer when the downloading data is decompressed, and a processing time by the data acquirer when the downloading data is not decompressed are associated with one another.

* * * * *